Feb. 3, 1942.   D. J. SARCHINO   2,271,664
BICYCLE STOP SIGNAL
Filed March 20, 1940

INVENTOR.
DOMINIC JOSEPH SARCHINO
BY
Hull, West & Chilton
ATTORNEYS.

Patented Feb. 3, 1942

2,271,664

UNITED STATES PATENT OFFICE 2,271,664

BICYCLE STOP SIGNAL

Dominic Joseph Sarchino, Brooklyn, N. Y.

Application March 20, 1940, Serial No. 325,031

3 Claims. (Cl. 177—337)

This invention relates to new and useful improvements in means for operating stop lights for vehicles and more particularly to means for operating stop lights that are adapted for use with bicycles.

The general object of the invention is to provide, for a bicycle equipped with the usual coaster brakes, a circuit including a stop light, which circuit is adapted to be closed and opened by the operations of applying and removing the coaster brake. A further object of the invention is to provide a circuit of this type wherein the wiring and the contacts are located where they are conveniently accessible; also to provide a circuit wherein the ordinary night signal lamp may be used as a stop light in the daytime and as a combined night signal lamp and stop light at night. A still further object of the invention is to provide simple, efficient and economical means for realizing the foregoing objects.

Figure 1:
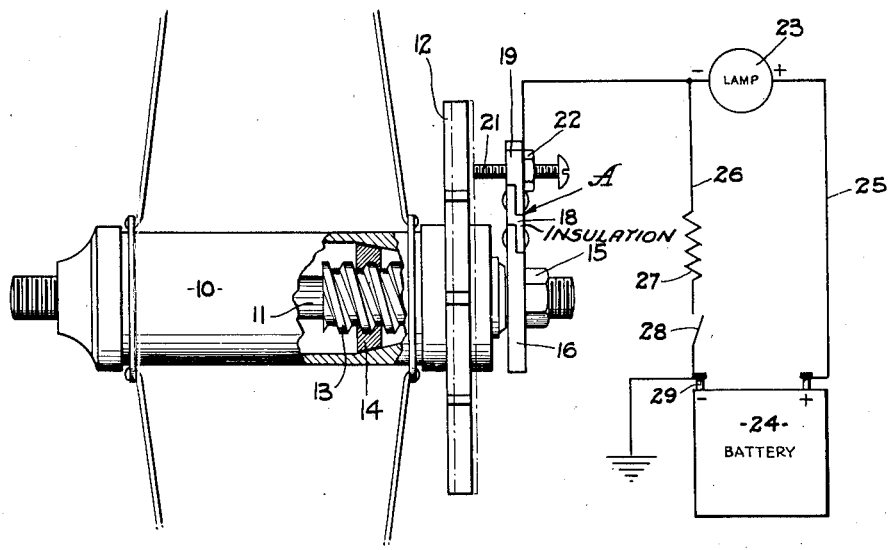
Figures 2, 3:
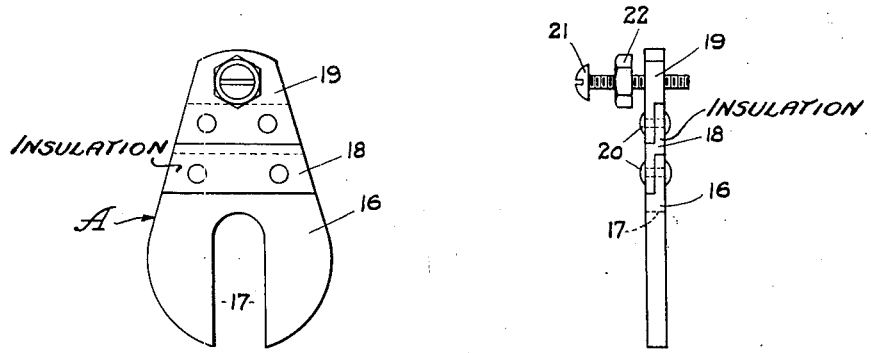

In the drawing forming part hereof, Fig. 1 represents a view in elevation, with parts broken away, of the rear hub, axle, and sprocket of a bicycle incorporated within an electrical circuit, the electrical circuit proper, including the lamp, being shown diagrammatically; Fig. 2 is a view in elevation of the composite plate, which supports one of the contacts, and which is mounted on the rear axle; and Fig. 3 a central sectional view through the said plate.

Describing the parts herein by reference characters, 10 denotes the rear hub, 11 the rear axle, and 12 the rear sprocket of a bicycle, the rear sprocket being mounted upon the axle in the usual manner and being operatively connected with the worm 13 having the clutch 14 thereon by means of which the rear sprocket and hub are rotated when the bicycle is being driven forwardly. A denotes a composite plate which is clamped upon the rear axle by means of a nut 15, the said composite plate comprising a lower member 16 having a central slot 17 by which the plate is applied to the rear axle; an intermediate member 18, and an upper metallic member 19, the intermediate member being connected to the members 16 and 19 as by means of rivets 20. Where the members 16 and 19 are made of metal, the member 18 is made of insulating material.

21 denotes a contact screw which is threaded through the upper member 19, being provided with a lock nut 22 to hold it in adjusted position so that, when the bicycle is being driven forwardly, there will only be a slight clearance (about 1/16 to 1/64 inch) between the rear sprocket 12 and the adjacent end of the said contact screw. However, on back-pedaling in order to apply the brake in the usual manner, there is sufficient outward movement of the rear sprocket to permit it to engage the tip of the contact screw, as indicated by dot-and-dash lines on Fig. 1.

23 denotes a night lamp, such as bicycles are usually provided with, the ordinary circuit for said lamp including the battery 24, wires 25, 26, resistance 27, and switch 28, the wire 25 leading from the positive pole of the battery and the negative pole being grounded or connected to the frame. Where the ordinary dry cell is employed, the outer zinc wall of the same will constitute the negative pole with which the binding post 29 is connected, and this wall is connected with the metallic frame assembly in any convenient manner. It will be noted that, with the circuit as thus far described, the lamp 23 will be illuminated only when the switch 28 is closed. However, when the brake is applied in the usual manner, the outward movement of the sprocket 12 will close the lighting circuit through the wire 25, lamp 23, plate member 19 and contact 21 to the sprocket, which forms part of the metal frame assembly to which the negative pole of the battery is grounded.

This outward or lateral movement of the sprocket is due to the lateral lost-motion, or working clearance, that is necessarily provided in the sprocket bearing and through which the sprocket moves laterally outwardly due to brake reaction, as the brake is being applied.

From the foregoing, it follows that, in daylight driving (when the switch 28 will be open) the lamp 23 will be illuminated only when the operator applies the brake, by back pedaling. At night, however, the switch 28 will be closed, whereupon the lamp 23 will operate in the usual manner as a night lamp; but, upon applying the brake, the resistance 27 will be cut out and the lamp will give a much brighter light than when the brake is not applied, whereby the lamp will serve to operate efficiently both as a night lamp and as a warning signal lamp or stop light.

Where the members 18 and 19 of the composite plate A are of metal, by interposing the member 18 therebetween, the latter member serves not only as an insulating member, but constitutes a flexible mounting for the member 19, thereby enabling the plate as a whole to compensate for the forces which may be exerted upon the contact screw by the sprocket 12.

From the foregoing description, taken in connection with the drawing, it will be evident that I have produced a very simple and efficient circuit which includes and operates a stop light and one which will enable the ordinary night lamp to perform its usual function as well as operating as a warning lamp or stop light.

Having thus described my invention, what I claim is:

1. Means for operating the stop light for a bicycle provided with a coaster brake and a rear sprocket which is movable slightly inwardly and outwardly by the release and the application of the brake, said means comprising a contact adjacent to and insulated from the said sprocket and adapted to be engaged by the latter as it is moved outwardly due to the reaction caused by the application of the brake, and an electric circuit including the stop light the said contact and the said sprocket and adapted to be closed by the engagement of the sprocket with the said contact.

2. Means for operating the stop light for a bicycle having a sprocket, a coaster brake and a rear axle on which the said sprocket is mounted, the sprocket being movable slightly inwardly and outwardly on said axle by the release and the application of the brake, said means comprising a support mounted upon the rear axle, a contact adjustably mounted in the said support and insulated from the said axle and adapted to be engaged by the sprocket when the latter is moved outwardly, due to the reaction caused by the application of the brake, and an electric circuit including the said stop light, the said contact, and the said sprocket.

3. Means for operating a stop signal for a bicycle provided with a coaster brake and a rear sprocket which is movable slightly inwardly and outwardly by the release and the application of the brake, said means comprising a fixed contact mounted adjacent to the sprocket, the said sprocket comprising a contact adapted to engage the fixed contact by the movement of the sprocket due to the reaction caused by the application of the brake.

DOMINIC JOSEPH SARCHINO.